United States Patent [19]

Kawai et al.

[11] Patent Number: 5,269,271
[45] Date of Patent: Dec. 14, 1993

[54] APPARATUS FOR CONTROLLING SPEED OF INTERNAL COMBUSTION ENGINE

[75] Inventors: Katsuhiko Kawai; Kazuhiro Nakai; Hiroshi Ikeda, all of Kariya; Yasuhito Takasu, Toyohashi, all of

[73] Assignee: Nippondenso Co., Ltd., Kariya, Japan

[21] Appl. No.: 896,389

[22] Filed: Jun. 10, 1992

[30] Foreign Application Priority Data

| Jun. 10, 1991 | [JP] | Japan | 3-137812 |
| Jun. 14, 1991 | [JP] | Japan | 3-170687 |
| Jul. 30, 1991 | [JP] | Japan | 3-212841 |
| May 20, 1992 | [JP] | Japan | 4-152818 |

[51] Int. Cl.$^5$ ............................................. F02D 41/16
[52] U.S. Cl. ................................ 123/339; 123/418
[58] Field of Search ................ 123/339, 418, 352; 364/431.07

[56] References Cited

U.S. PATENT DOCUMENTS

| 4,492,195 | 1/1985 | Takahashi et al. | 123/339 |
| 4,638,778 | 1/1987 | Kamei et al. | 123/339 |
| 4,653,449 | 3/1987 | Kamei et al. | 123/339 X |
| 4,785,780 | 11/1988 | Kawai | 123/339 |
| 4,860,707 | 8/1989 | Ohata | 123/339 |
| 4,884,540 | 12/1989 | Kishimoto et al. | 123/339 |
| 5,121,726 | 6/1992 | Di Nunzio et al. | 123/339 |
| 5,133,319 | 7/1992 | Ikeda et al. | 123/418 X |

FOREIGN PATENT DOCUMENTS 59-7751 1/1984 Japan.
63-25175 5/1988 Japan.

*Primary Examiner*—Tony M. Argenbright
*Attorney, Agent, or Firm*—Cushman, Darby & Cushman

[57] ABSTRACT

A speed control apparatus for an engine which is equipped with an air quantity control device for controlling an intake air quantity to the engine when being in an idling state and a speed control device for determining a control amount of the air quantity control device on the basis of the actual engine idle speed. For controlling the engine idle speed, the apparatus comprises a state variable outputting section for outputting the actual engine idle speed, the control amount of the air quantity control device and an ignition timing control amount of an igniter of the engine as state variables representing an internal state of a dynamic model of the engine, a speed deviation accumulating section for accumulating a deviation between the target speed and the actual engine idle speed, and an ignition timing deviation accumulating section for accumulating a deviation between a target ignition timing and the actual ignition timing. The control amount of the air quantity control device and the ignition timing control amount are calculated on the basis of optimal feedback gains of an air system and an ignition system predetermined on the basis of the dynamic model, the state variables, the speed deviation accumulated value and the ignition timing deviation accumulated value. This arrangement can simultaneously control the air quantity and the ignition timing without using an observer to easily control the engine idle speed to the target speed.

12 Claims, 9 Drawing Sheets

APPARATUS FOR CONTROLLING SPEED OF INTERNAL COMBUSTION ENGINE

BACKGROUND OF THE INVENTION

The present invention relates to apparatus for controlling the speed of an internal combustion engine, and more particularly to engine speed control apparatus for optimally controlling the engine speed in accordance with the modern control theory.

Such an engine speed control apparatus based on the modern control theory is provided with an observer for estimating an internal state on the basis of control input and output information, the control input being the intake air quantity or the ignition timing and the control output being the engine speed (engine idle speed) and the air fuel ratio as disclosed in the Japanese Patent Publication No. 63-25175. On the other hand, although representing the internal state of a speed controlling system by state variables to determine a necessary control input (controlled quantity of the intake air), the modern control provides a problem that the state variables are required to be obtained by constructing an observer and the construction of the observer takes much time and much trouble because requiring to select adequate parameters and the like by a number of simulations. In addition, since the observer is constructed in correspondence with a dynamic model of a controlled object, the observation of the state variables depends upon only the accuracy in constructing the dynamic model of the speed control system and hence, for heightening the observation accuracy of the state variables due to the observer, the modeling of the controlled object is required to be effected with a high accuracy whereby the model becomes complicated so as to make it difficult to perform the control in practice because of enlarging the load in the control calculations and the like. Thus, the Japanese Patent provisional Publication No. 64-8336 (corresponding to the U.S. Pat. No. 4,785,780) discloses an idle speed control apparatus which controls the engine idle speed by controlling the intake air amount (one control input) without using the observer. There is a problem which arises with such an idle speed control apparatus, however, in that there is a limit in the responsibility due to the delay (dead time) of the air system (surge tank capacity, stroke and others) and the exceeding of this limit makes it difficult to perform the control on the basis of two control inputs including the ignition timing. Moreover, in the case of performing the optimal control on the basis of the multi-input (plural kinds of control amounts) system in accordance with the conventional technique, the calculation amount is extremely increased so as to make it difficult to use the current vehicle computer which has a limit in the calculation speed.

SUMMARY OF THE INVENTION

It is therefore an object of the present invention to provide an engine speed control apparatus which is capable of easily and optimally controlling the engine speed.

In accordance with the present invention, there is provided a speed control apparatus for an internal combustion engine which is equipped with speed detecting means for detecting an idle speed of said engine; air quantity control means for controlling an intake air quantity to said engine when said engine is in an idling state; and speed control means for determining a control amount of said air quantity control means on the basis of the detected idle speed of said engine to control the detected engine idle speed to a target speed, said apparatus comprising: a state variable outputting section for outputting the detected idle speed of said engine, the control amount of said air quantity control means and an ignition timing control amount of an igniter of said engine as state variables representing an internal state of a dynamic model of said engine; a speed deviation accumulating section for accumulating a deviation between said target speed and the detected engine idle speed to obtain a speed variation accumulated value; an ignition timing deviation accumulating section for accumulating a deviation between a target ignition timing and an actual ignition timing detected to obtain an ignition timing deviation accumulated value; and an air system and ignition system control amount calculating section for calculating said control amount of said air quantity control means and said ignition timing control amount of said igniter on the basis of optimal feedback gains of an air system and an ignition system predetermined on the basis of said dynamic model, said state variables, said speed deviation accumulated value and said ignition timing deviation accumulated value.

In accordance with this invention, there is provided further a control apparatus for an internal combustion engine which is equipped with operating state value detecting means for detecting an operating state value of said engine; first control means for controlling a first control amount affecting said operating state value of said engine; and target value control means for determining a control amount of said first control means on the basis of the detected operating state value of said engine to control the detected operating state value to a target value, said control apparatus comprising: a state variable outputting section for outputting the detected operating state value of said engine, said control amount of said first control means and a second control amount affecting said operating state value of said engine as state variables representing an internal state of a dynamic model of said engine; an operating state value deviation accumulating section for accumulating a deviation between said target value and the detected operating state value; a second control amount deviation accumulating section for accumulating a deviation between a target value for said second control amount and the second control amount detected to obtain a second control amount deviation accumulated value; and a first and second controlled system control amount calculating section for calculating said control amount of said first control means and said second control amount on the basis of optimal feedback gains of first and second controlled systems predetermined on the basis of said dynamic model, said state variables, said operating state value deviation accumulated value and said second control amount deviation accumulated value.

Further, according to this invention, there is provided a speed control apparatus for an internal combustion engine for determining a speed of said engine on the basis of a model set with a multi-input and one- or multi-output system which is responsive to a first control input having a dead time at its input section and a second control input not having a dead time to output at least an engine speed as an output amount, said apparatus comprising: state variable setting means for setting said engine speed and said first and second control inputs as state variables representing an internal state of said model; first calculating means for calculating said first control input on the basis of optimal feedback gains predetermined in accordance with said model, said state variables, and said past first control input corresponding to said dead time; and second calculating means for calculating said second control input on the basis of said optical feedback gains predetermined in accordance with said model, and said state variables.

Still further, according to this invention, there is provided a speed control apparatus for an internal combustion engine for determining a speed of said engine on the basis of a model set with m-input t-output control system which is responsive to m control inputs having a dead time to generate t outputs including an engine speed and which is expressed in accordance with a state equation (A), wherein, with respect to said m-input t-output control system, a feedback control system for controlling said outputs to target values is determined as an augmented system in accordance with an equation (B), an optimal augmented system control input Ve (k) for minimizing an evaluation function J indicated by an equation (C) is determined in accordance with an equation (D), and an $i^{th}$ ui (k) is determined on the basis of a matrix Hi defined by an equation (E) in accordance with an equation (F):

$$X(k+1) = AX(k) + BV(k)$$

$$Y(k) = CX(k) \tag{A}$$

where
- $V^T(k) = [u_1(k-L_1)\ u_2(k-L_2) \ldots u_i(K-L_i) \ldots u_m(k-L_m)]$;
- X represents a state variable matrix which is a $(n \times 1)$ matrix;
- V represents an input matrix which is a $(m \times 1)$ matrix;
- Y represents an output matrix which is a $(t \times 1)$ matrix;
- A represents a matrix which is a $(n \times n)$ matrix;
- B represents a matrix which is a $(n \times m)$ matrix;
- C represents a matrix which is a $(t \times n)$ matrix; and
- $L_1, L_2, \ldots, L_m$ represent the number of samples corresponding to a dead time existing in control inputs $u_1, u_2, \ldots, u_m$, $$Z(k+1) = Ae\ Z(k) + Be\ Ve(k)$$

$$E(k) = Ce\ Z(k) \tag{B}$$

where Z (k) represents a state variable matrix and E (k) represents a deviation matrix:

$$Z(k) = \begin{bmatrix} X(k) - X(k-1) \\ E(k) \end{bmatrix}$$

$$E(k) = R - Y(k) \quad (R: \text{target value});$$

and, Ve (k) represents an augmented input matrix:

$$Ve(k) = V(k) - V(k-1) = \tag{C}$$

$$\begin{bmatrix} u1\ (k-L1) - u1\ (k-L1-1) \\ u2\ (k-L2) - u1\ (k-L2-1) \\ \vdots \\ um(k-Lm) - um(k-Lm-1) \end{bmatrix}$$

-continued $$Ae = \begin{bmatrix} A & \underline{0} \\ -CA & It \end{bmatrix}$$

$$Be = \begin{bmatrix} B \\ -CB \end{bmatrix}$$

$$Ce = [\underline{0}\ It] \quad (It: \text{unit matrix of } (t \times t))$$

$$J = \sum_{j=0}^{\infty} [Z^T(j)QZ(j) + Ve^T(j)RVe(j)]$$

where $$Q = \begin{bmatrix} q1 & & & \\ & q2 & \underline{0} & \\ & & \ldots & \\ \underline{0} & & & q(n+t) \end{bmatrix}$$

$$R = \begin{bmatrix} r_1 & & & \\ & r2 & \underline{0} & \\ & & \ldots & \\ \underline{0} & & & r_m \end{bmatrix}$$

here, $\underline{0}$ represents a zero matrix, $$Ve(k) = -F \cdot Z(k) \tag{D}$$

where F represents an optimal feedback gain matrix:

$$F = \begin{bmatrix} F1 \\ F2 \\ \cdot \\ \cdot \\ \cdot \\ Fm \end{bmatrix} = -(R + Be^T\ PBe)^{-1}\ Be^T\ PAe$$

and P is the solution of the following Riccati equation:

$$P = Ae^T\ PAe - Ae^T\ PBe\ (Be^T\ PBe + R)^{-1}\ Be^T\ PAe + Q. \tag{E}$$

$$Hi = [D_i^{(Li)}\ D_i^{(Li-1)} \cdot Bi\ D_i^{(Li-2)} \cdot Bi \ldots Di \cdot Bi\ Bi]$$

where $$Di = Ae - \sum_{j=1}^{m} Bj \cdot Fj + Bi \cdot Fi$$

$$ui(k) = -Fi \cdot Hi \begin{bmatrix} x(k) \\ \sum_{j=0}^{k} E(j) \\ ui(k - Li) \\ ui(k - Li + 1) \\ \cdot \\ \cdot \\ \cdot \\ ui(k-2) \\ ui(k-1) \end{bmatrix} \tag{F}$$

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
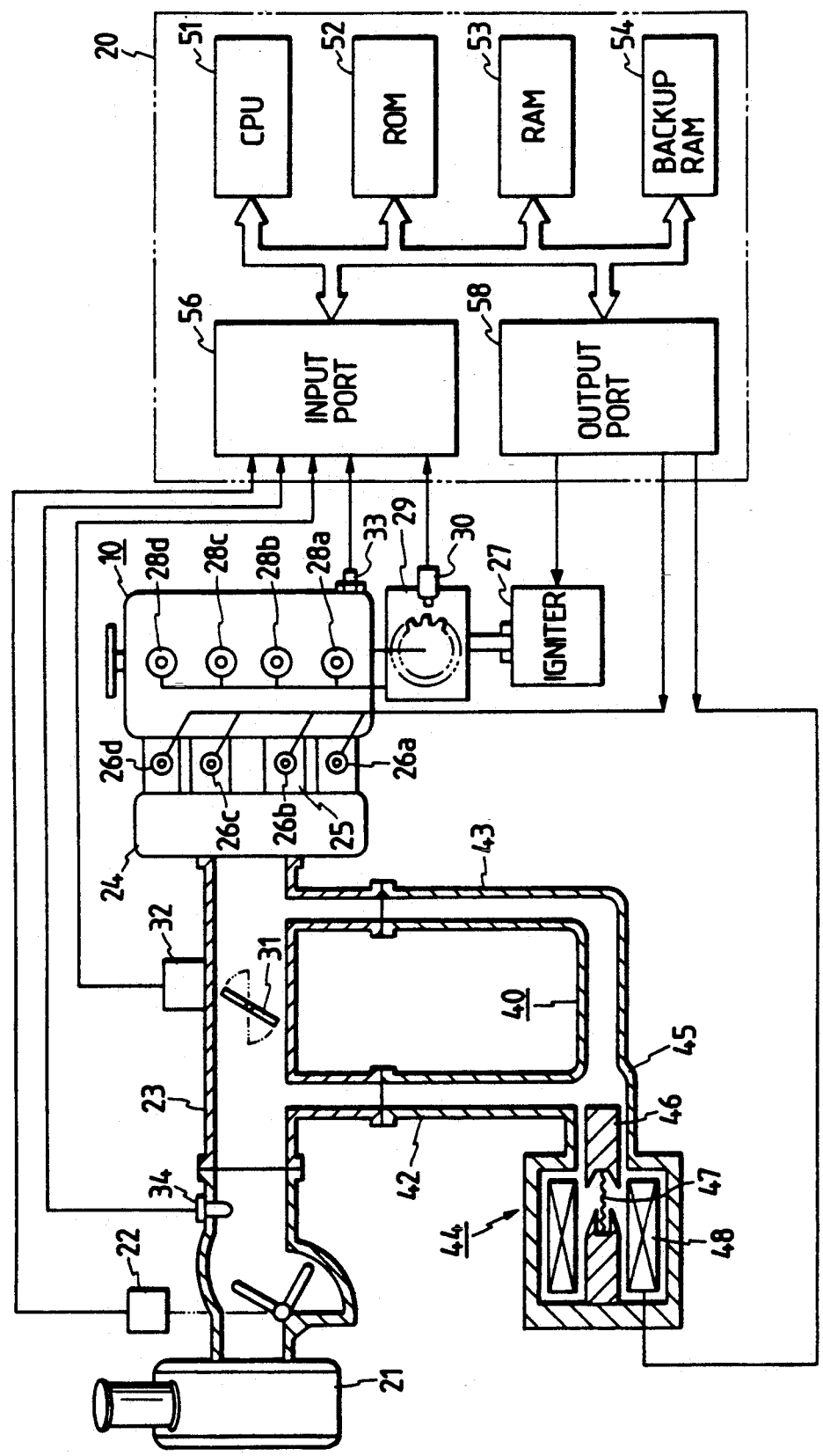
FIG. 1 is an illustration of an engine speed control apparatus according to a first embodiment of the present invention.

A description will be made hereinbelow in terms of a first embodiment of the present invention with reference to FIG. 1 showing an engine speed control apparatus of this first embodiment which is applied to an internal combustion engine mounted on a motor vehicle. In FIG. 1, the engine 10 is of the 4-cylinder 4-cycle and spark ignition type where the intake air is introduced through an air cleaner 21, an airflow meter 22, an intake pipe 23, a surge tank 24 and an intake branch pipe 25 into the respective cylinders and the fuel is fed from a fuel tank (not shown) under pressure so as to be supplied and injected through fuel injection valves 26a to 26d provided in the intake branch pipe 25 into the respective cylinders. Further, in the engine 10 there are provided a distributor 29 for distributing a high-voltage electric signal from an igniter 27 to ignition plugs 28a to 28d for the respective cylinders, a speed sensor 30 disposed within the distributor 29 for detecting the rotational speed Ne of the engine 10, a throttle sensor 32 for detecting the opening degree TH of a throttle valve 31, a water temperature sensor 33 for detecting the temperature Thw of the cooling water of the engine 10, and an intake air temperature sensor 34 for detecting the temperature Tam of the intake air to the engine 10. The speed sensor 30 is disposed in opposed relation to a ring gear rotatable in synchronism with the crank shaft of the engine 10 and arranged to output a pulse signal comprising 24 pulses at every one revolution (720° CA) of the engine 10 in proportional to the engine speed. The throttle sensor 32 outputs an analog signal corresponding to the opening degree TH of the throttle value 31 and further outputs an ON-OFF signal through an idle switch for detecting the fact that the throttle valve 31 is substantially in the fully opening state.

In addition, in the intake air system of the engine 10 there is provided a bypass passage 40 for bypassing the throttle valve 31 to control the intake air quantity AR when the engine 10 is in the idling state. The bypass passage 40 includes air guide pipes 42, 43 and an air control valve (which will be referred hereinafter to as ISC valve) 44. This ISC valve 44 basically comprises a linear solenoid type control valve in which the air passage area (air supply amount) between the air guide pipes 42 and 43 is controllable by the position of a plunger 46 provided within a housing 45 to be movable. Further, the ISC valve 44 is arranged such that the plunger 46 is normally biased by a compression coil spring 47 to set the air passage area to zero and the plunger 46 is driven by supply an exciting current to an exciting coil 48 so as to open the air passage. That is, the bypass air flow quantity is controllable by continuously controlling the exciting current to the exciting coil 48. In this case, the exciting current to the exciting coil 48 is controlled in accordance with the so-called pulse width modulation (PWM) technique to control the duty ratio of the width of the pulse to be applied to the exciting coil 48. Here, it is also appropriate to use as the ISC valve 44 a diaphragm controlling type valve, a step motor-controlled valve or others. As well as the fuel injection valves 26a to 26d and the igniter 27, the ISC valve 44 is drive-controlled through an electronic control unit (ECU) 20.

The electronic control unit 20 is constructed as an arithmetic and logic calculation unit basically comprising a well-known central processing unit (CPU) 52, a lead-only memory (ROM) 52, a random access memory (RAM) 53, a backup RAM 54 and others which are coupled through a common bus 59 to each other and coupled through the common bus 59 to an input port 56 for inputting the detection signals from the above-mentioned sensors and further to an output port 58 for outputting control signals to the respective actuators. That is, the electronic control unit 20 inputs through the input port 56 the intake air quantity AR, intake air temperature Tam, throttle opening degree TH, cooling water temperature Thw, the engine speed Ne and others and calculates the fuel injection amount $\tau$, ignition timing Iq, ISC valve opening degree $\theta$ and others on the basis of the inputted data to output control signals through the output port 58 to the fuel injection valves 26a to 26d, igniter 27, ISC valve 44 and others in accordance with the calculation results. Of these controls, the idle speed control will be described hereinbelow.

The electronic control unit 20 is in advance designed in accordance with the following method for performing the idle speed control.

1) MODELING OF CONTROLLED OBJECT (IDENTIFICATION)

As a model of a system for controlling the idle speed of the engine 10 there is used an autoregressive moving average model having a dead time p (=0, 1, 2, ... ) and an order [n, m]. Further, disturbance d is taken into consideration for approximation. The model of idle speed controlling system based on the autoregressive moving average model can be approximated as follows.

$$Ne(i) = a1 \cdot Ne(i - 1) + a2 \cdot Ne(i - 2) + \ldots + \qquad (1)$$
$$an \cdot Ni(i - n) + b1 \cdot u(i - 1 - p) +$$
$$b2 \cdot u(i - 2 - p) + \ldots +$$
$$bm \cdot u(i - m - p) + d(i - 1) +$$
$$c1 \cdot u'(i - 1 - p') + c2 \cdot u'(i - 2 - p') + \ldots +$$
$$cm' \cdot u'(i - m' - p')$$

where
Ne: the speed of the internal combustion engine;
u: the control value of the ISC valve;
u': the control value of the igniter; and d: the disturbance In this embodiment an autoregressive moving average model having n=2, m=1 and m'=2 is used and hence the aforementioned equation (1) is rewritten as follows under the conditions of p=6 and p'=1.

$$Ne(i)=a_1 \cdot Ne(i-1)+a_2 \cdot Ne(i-2)+ \\ b_1 \cdot u(i-7)+d(i-1)+c_1 \cdot u'(i-2)+c_2 \cdot u'(i-3) \quad (2)$$

Hereinafter, u is expressed as DOP and u' is expressed as AOP.

2) METHOD OF EXPRESSING STATE VARIABLES X

The aforementioned equation (2) is rewritten as follows if using the state variables $X(i)=[X_1(i)\ X_2(i)\ X_3(i)\ X_4(i) \ldots X_{10}(i)]^T$:

$$\begin{pmatrix} X_1(i+1) \\ X_2(i+1) \\ X_3(i+1) \\ X_4(i+1) \\ X_5(i+1) \\ X_6(i+1) \\ X_7(i+1) \\ X_8(i+1) \\ X_9(i+1) \\ X_{10}(i+1) \end{pmatrix} = \begin{pmatrix} a_1 & a_2 & 0 & 0 & 0 & 0 & 0 & b_1 & c_1 & c_2 \\ 1 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 1 & 0 & 0 & 0 & 0 & 0 & 0 & 0 \\ 0 & 0 & 0 & 1 & 0 & 0 & 0 & 0 & 0 & 0 \\ 0 & 0 & 0 & 0 & 1 & 0 & 0 & 0 & 0 & 0 \\ 0 & 0 & 0 & 0 & 0 & 1 & 0 & 0 & 0 & 0 \\ 0 & 0 & 0 & 0 & 0 & 0 & 1 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 1 & 0 \end{pmatrix} \begin{pmatrix} X_1(i) \\ X_2(i) \\ X_3(i) \\ X_4(i) \\ X_5(i) \\ X_6(i) \\ X_7(i) \\ X_8(i) \\ X_9(i) \\ X_{10}(i) \end{pmatrix} + \begin{pmatrix} 0 & 0 \\ 0 & 0 \\ 1 & 0 \\ 0 & 0 \\ 0 & 0 \\ 0 & 0 \\ 0 & 0 \\ 0 & 0 \\ 0 & 1 \\ 0 & 0 \end{pmatrix} \begin{pmatrix} DOP(i) \\ AOP(i) \end{pmatrix} + \begin{pmatrix} 1 \\ 0 \\ 0 \\ 0 \\ 0 \\ 0 \\ 0 \\ 0 \\ 0 \\ 0 \end{pmatrix} d \quad (3)$$

where $X_1(i)=Ne(i)$, $X_2(i)=Ne(i-1)$, $X_3(i)=DOP(i-1)$, $X_4(i)=DOP(i-2)$, $X_5(i)=DOP(i-3)$, $X_6(i)=DOP(i-4)$, $X_7(i)=DOP(i-5)$, $X_8(i)=DOP(i-6)$, $X_9(i)=AOP(i-1)$, $X_{10}(i)=AOP(i-2)$, and hence it is possible to use $X(i)=[Ne(i), Ne(i-1), DOP(i-1), \ldots, DOP(i-6), AOP(i-1), AOP(i-2)]^T$ (All the state quantities are known).

3) DESIGN OF REGULATOR

A general optimal regulator does not have a function to converge the output to a target value. Accordingly, for the idle speed control it is required to use an augmented system regulator into which the difference $(e(i)=NT(i)-Ne(i))$ between the target speed and the actual speed is introduced. Thus, this embodiment is based on the following.

$$\lim_{i \to \infty} e(i) \to 0$$

Figure 2A:
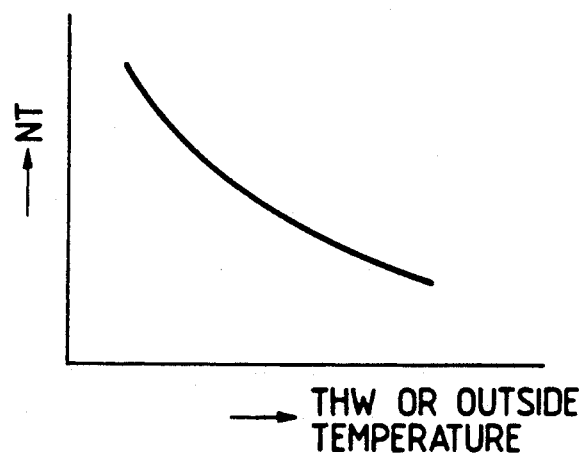
FIG. 2A is a graphic illustration for showing the relation between the target engine speed and the cooling water temperature or the outside temperature.
Figure 2B:
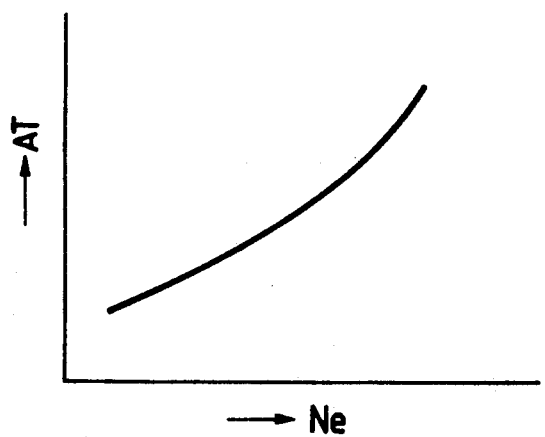
FIG. 2B is a graphic illustration for showing the relation between the target ignition timing and the engine speed.

That is, for perform the control that the controlled frequency follows the fixed value target input, the system is designed so that the error $e_1(i)=NT(i)-Ne(i)$ is converged to zero and the error $e_2(i)=AT(i)-ADP(i)$ is also converged to zero, thereby achieving 2 inputs and 2 outputs. Here, NT(i): the target speed, and AT(i): the target ignition timing. FIG. 2A shows the target speed NT(i) and FIG. 2B shows the target ignition timing AT(i), where it is assumed that $d(i)=d(i-1)$, $Nt(i)=NT(i-1)$ and $AT(i)=AT(i-1)$.

Further, when q is applied as the time transition applying system to $e_1(i+1)=NT(i+1)-Ne(i+1)$ for forming the augmented system, the following equation is obtained:

$$\begin{aligned}
(1-q^{-1})e1(i+1) &= (1-q^{-1})\{NT(i+1)-Ne(i+1)\} \\
&= -(1-q^{-1})Ne(i+1) \\
&= -a1(1-q^{-1})Ne(i) \\
&\quad -a2(1-q^{-1})Ne(i-1) \\
&\quad -b1(1-q^{-1})DOP(i-6) \\
&\quad -c1(1-q^{-1})AOP(i-1) \\
&\quad -c2(1-q^{-1})AOP(i-2) \\
\therefore e1(i+1) &= e1(i) \quad -a1(1-q^{-1})Ne(i) \\
&\quad -a2(1-q^{-1})Ne(i-1) \\
&\quad -b1(1-q^{-1})DOP(i-6) \\
&\quad -c1(1-q^{-1})AOP(i-1) \\
&\quad -c2(1-q^{-1})AOP(i-2)
\end{aligned}$$

Further, when $(1-q^{-1})$ is applied to $e_2(i)=AT(i)-AOP(i)$, the following equation is obtained:

$$(1-q^{-1})e_2(1-q^{-1})\{AT(i)-AOP(i)\}=-(1-q^{-1})AOP(i)$$

$$\therefore e_2(i)=e_2(i-1)-(i-q^{-1})AOP(i)$$

Thus, the following equation can be obtained as a state equation in the augmented system.

$$\begin{pmatrix} (1-q^{-1})Ne(i+1) \\ (1-q^{-1})Ne(i) \\ (1-q^{-1})DOP(i) \\ (1-q^{-1})DOP(i-1) \\ (1-q^{-1})DOP(i-2) \\ (1-q^{-1})DOP(i-3) \\ (1-q^{-1})DOP(i-4) \\ (1-q^{-1})DOP(i-5) \\ (1-q^{-1})AOP(i) \\ (1-q^{-1})AOP(i-1) \\ e_1(i+1) \\ e_2(i) \end{pmatrix} = \quad (4)$$

$$\begin{pmatrix} a_1 & a_2 & 0 & 0 & 0 & 0 & 0 & b_1 & c_1 & c_2 & 0 & 0 \\ 1 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 \\ 0 & 0 & 0 & 1 & 0 & 0 & 0 & 0 & 0 & 0 & 0 & 0 \\ 0 & 0 & 0 & 0 & 1 & 0 & 0 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 1 & 0 & 0 & 0 \\ -a_1 & -a_2 & 0 & 0 & 0 & 0 & 0 & -b_1 & -c_1 & -c_1 & 1 & 0 \\ 0 & 0 & 0 & 0 & 0 & 0 & 0 & 0 & 0 & 0 & 0 & 1 \end{pmatrix} \begin{pmatrix} (1-q^{-1})Ne(i) \\ (1-q^{-1})Ne(i-1) \\ (1-q^{-1})DOP(i-1) \\ (1-q^{-1})DOP(i-2) \\ (1-q^{-1})DOP(i-3) \\ (1-q^{-1})DOP(i-4) \\ (1-q^{-1})DOP(i-5) \\ (1-q^{-1})DOP(i-6) \\ (1-q^{-1})AOP(i-1) \\ (1-q^{-1})AOP(i-2) \\ e_1(i) \\ e_2(i-1) \end{pmatrix} +$$

-continued $$\begin{pmatrix} 0 & 0 \\ 0 & 0 \\ 1 & 0 \\ 0 & 0 \\ 0 & 0 \\ 0 & 0 \\ 0 & 0 \\ 0 & 0 \\ 0 & 1 \\ 0 & 0 \\ 0 & 0 \\ 0 & -1 \end{pmatrix} \begin{pmatrix} (1-g^{-1})DOP(i) \\ (1-g^{-1})AOP(i) \end{pmatrix}$$

$$y = \begin{pmatrix} 0\,0\,0\,0\,0\,0\,0\,0\,0\,0\,0\,1 \\ 0\,0\,0\,0\,0\,0\,0\,0\,0\,0\,1\,0 \end{pmatrix} \begin{pmatrix} (1-q^{-1})Ne(i) \\ (1-q^{-1})Ne(i-1) \\ (1-q^{-1})DOP(i-1) \\ (1-q^{-1})DOP(i-2) \\ (1-q^{-1})DOP(i-3) \\ (1-q^{-1})DOP(i-4) \\ (1-q^{-1})DOP(i-5) \\ (1-q^{-1})DOP(i-6) \\ (1-q^{-1})AOP(i-1) \\ (1-q^{-1})AOP(i-2) \\ e_1(i) \\ e_2(i-1) \end{pmatrix} \quad (5)$$

At this time, the evaluation function is as follows, and the optimal regulator is designed on the basis of the evaluation function.

$$J = \sum_{i=0}^{\infty} \{q_1(NT - Ne(i))^2 + q_2(AT - AOP(i-1))^2 + r_1(DOP(i) - DOP(i-1))^2 + r_2(AOP(i) - AOP(i-1))^2\}$$

4) DESIGN OF OPTIMAL REGULATOR

When the state feedback is performed in terms of the aforementioned equations (4) and (5), $$(1 - q^{-1})DOP(i) = (1 - q^{-1}) \{K1\,Ne(i) + K2\,Ne(i-1) + K3\,DOP(i-1) + K4\,DOP(i-2) + K5\,DOP(i-3) + K6\,DOP(i-4) + K7\,DOP(i-5) + K8\,DOP(i-6) + K9\,AOP(i-1) + K10\,AOP(i-2)\} + K11\,e1(i) + K12\,e2(i-1)$$

Thus, $$DOP(i) = K1\,Ne(i) + K2\,Ne(i-1) + K3\,DOP(i-1) + K4\,DOP(i-2) + K5\,DOP(i-3) + K6\,DOP(i-4) + K7\,DOP(i-5) + K8\,DOP(i-6) + K9\,AOP(i-1) + K10\,AOP(i-2) + \frac{K11\,(NT(i) - Ne(i))}{1-q^{-1}} + \frac{K12\,(AT(i-1) - AOP(i-1))}{1-q^{-1}}$$

Here, if using $$DI(i) = \frac{K11\,(NT(i) - Ne(i))}{1-q^{-1}}$$

$$DI(i) = DI(i-1) + K11\,(NT(i) - Ne(i))$$

Similarly, $$AI(i) = AI(i-1) + K12(AT(I-1) - AOP(i-1))$$

That is, in the case of the air system, $$DOP(i) = K1\,Ne(i) + \quad (6)$$
$$K2\,Ne(i-1) + K3\,DOP(i-1) + $$
$$K4\,DOP(i-2) + K5\,DOP(i-3) + $$
$$K6\,DOP(i-4) + K7\,DOP(i-5) + $$
$$K8\,DOP(i-6) + K9\,AOP(i-1) + $$
$$K10\,AOP(i-2) + DI(i) + AI(i)$$

Here, $$DI(i) = DI(i-1) + K11\,(NT(i) - Ne(i)) \quad (7)$$

$$AI(i) = AI(i-1) + K12\,(AT(i-1) - AOP(i-1)) \quad (8)$$

These are the accumulated value of the deviation between the target speed and the actual speed and the accumulated value of the deviation between the target ignition timing and the actual ignition timing at the time of the idling operation, respectively.

Further, in the case of the ignition timing, $$AOP(i) = K1'\,Ne(i) + \quad (9)$$
$$K2'\,Ne(i-1) + K3'\,DOP(i-1) + $$
$$K4'\,DOP(I-2) + K5'\,DOP(i-3) + $$
$$K6'\,DOP(i-4) + K7'\,DOP(i-5) + $$
$$K8'\,DOP(i-6) + K9'\,AOP(i-1) + $$
$$K10'\,AOP(i-2) + DI'(i) + AI'(i)$$

Here, $$DI'(i) = DI'(i-1) + K11'\,(NT(i) - Ne(i)) \quad (10)$$

$$AI'(i) = AI'(i-1) + K12'\,(AT(i-1) - AOP(i-1)) \quad (11)$$

These are the accumulated value of the deviation between the target speed and the actual speed and the accumulated value of the deviation between the target ignition timing and the actual ignition timing at the time of the idling operation, respectively.

The aforementioned optimal feedback gain $K = [K_1$ to $K_{12}$, $K_1'$ to $K_{12}'$] depends upon the model constants $a_1$, $a_2$, $b_1$, $c_1$, $c_2$. Accordingly, for ensuring the stability (robustness) of the system with respect to the actual variation (parameter variation) of the system for controlling the idle speed, the optimal feedback gain K is required to be designed in anticipation of the variations of the model constants $a_1$, $a_2$, $b_1$, $c_1$, $c_2$. Thus, the simulation is effected in expectation of the actually possible variations of the model constants $a_1$, $a_2$, $b_1$, $c_1$, $c_2$, thereby determining the optimal feedback gain K so as to satisfy the stability. As the factors of the variation there are the variation with passage of time such as the deterioration of the ISC valve 44 in performance and the clogging of the bypass passage, the variation in the load, and others. Here, it is appropriate that a plurality of optimal feedback gains (for example, including one for corresponding to a large load variation and the other for corresponding to a small load variation) are previously set and switched in accordance with the load variation state.

Although the description has been made hereinabove in terms of the modeling of the controlled object, the method of indicating the state variables, the design of the regulator and the determination of the optimal feedback gain, these are previously determined and hence the electronic control unit 20 actually performs the control only in accordance with the results, i.e., the above-mentioned equations (6) to (11).

Figure 3:
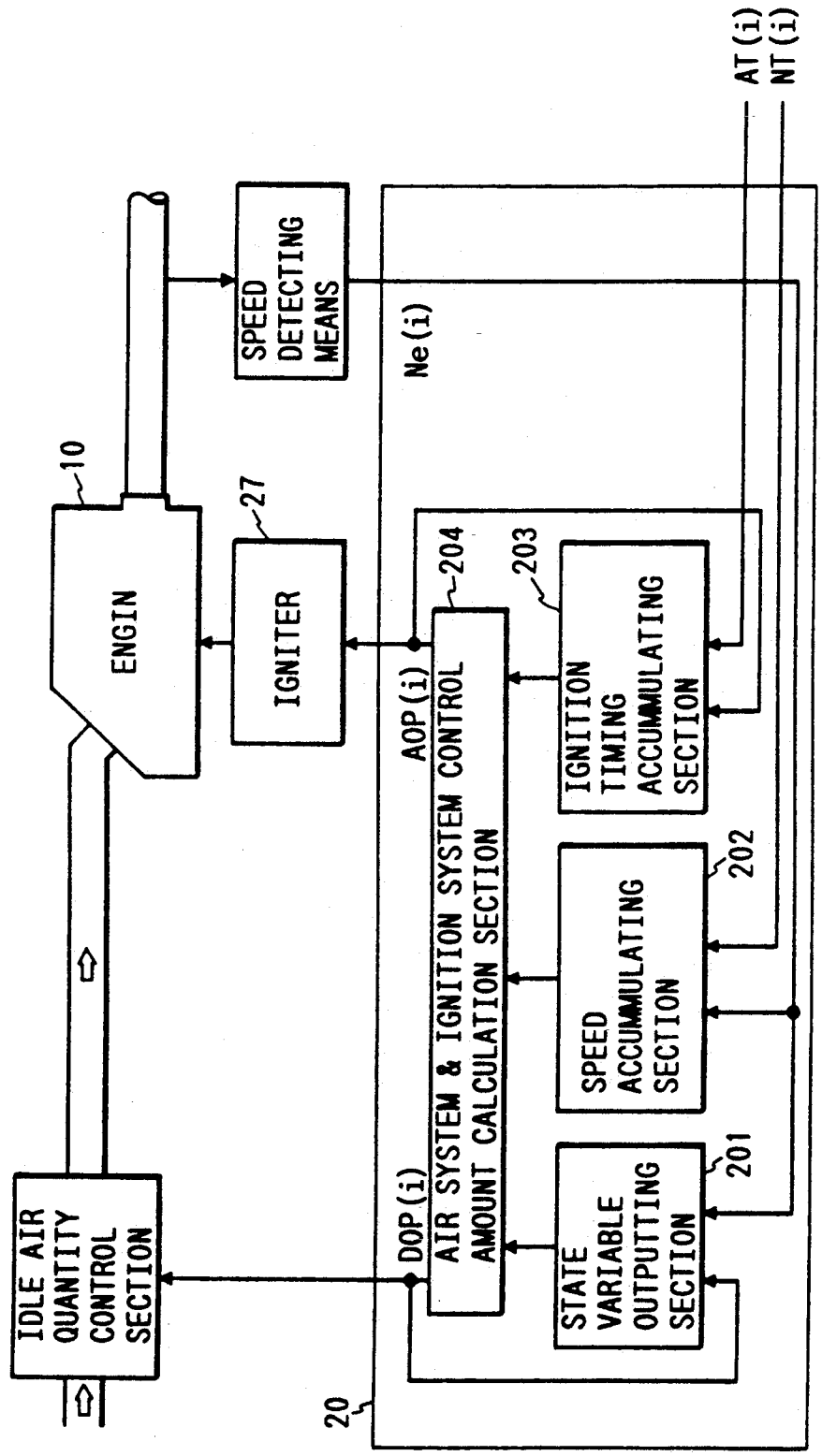
FIG. 3 shows a principle arrangement of the first embodiment of this invention.

FIG. 3 shows the principal arrangement of the embodiment of this invention. In FIG. 3, for controlling the rotational speed of an internal combustion engine to a target speed, there is provided an idle speed control apparatus arranged to determine the control amount of an idle air quantity control means on the basis of the speed of the engine detected by a speed detecting means (speed sensor 30), the idle air quantity control means being for controlling the intake air quantity when the engine is in the idling state. The idle speed control apparatus is equipped with a state variable outputting section 201, a speed deviation accumulating section 202, an ignition timing deviation accumulating section 203, and an air system and ignition system control amount calculating section 240. The state variable outputting section 201 outputs the speed of the engine, the control amount of the idle air quantity control means and the ignition timing control amount of the igniter 27 as state variables representative of the internal state of a dynamic model of the engine. The speed deviation accumulating section 202 accumulates the deviation between the target speed and the detected speed of the engine. The ignition timing deviation accumulating section 203 accumulates the deviation between the target ignition timing and the detected ignition timing. Further, the air system and ignition system control amount calculating section 204 calculates the control amount of the idle air quantity control means and the ignition timing control amount of the igniter 27 on the basis of the optimal feedback gains for the air system and the ignition system predetermined in accordance with the dynamic model, the state variables, the speed deviation value, and the ignition timing deviation value.

That is, in the idle speed control apparatus, the state variable outputting section 201 first outputs, as the state variables X representative of the internal state of the system for controlling the idle speed, the detected engine speed Ne, the control amount DOP of the idle air quantity control means up to the present and the ignition timing control amount AOP of the igniter 27. Secondly, the air system and ignition system control amount calculating section 204 calculates the control amount DOP of the idle air quantity control means and the ignition timing control amount AOP of the igniter 27 on the basis of the state variables X, the accumulated value of the deviation between the target speed NT and the idle speed Ne outputted from the speed deviation accumulating section 202, the accumulated value of the deviation between the target ignition timing AT and the actual ignition timing AOP outputted from the ignition timing deviation accumulating section 203, and the optimal feedback gains K and K', thereby controlling the control means and the igniter 27 on the basis of the calculated control amounts DOP and AOP so that the idle speed Ne is controlled to the target speed NT.

Figure 4:
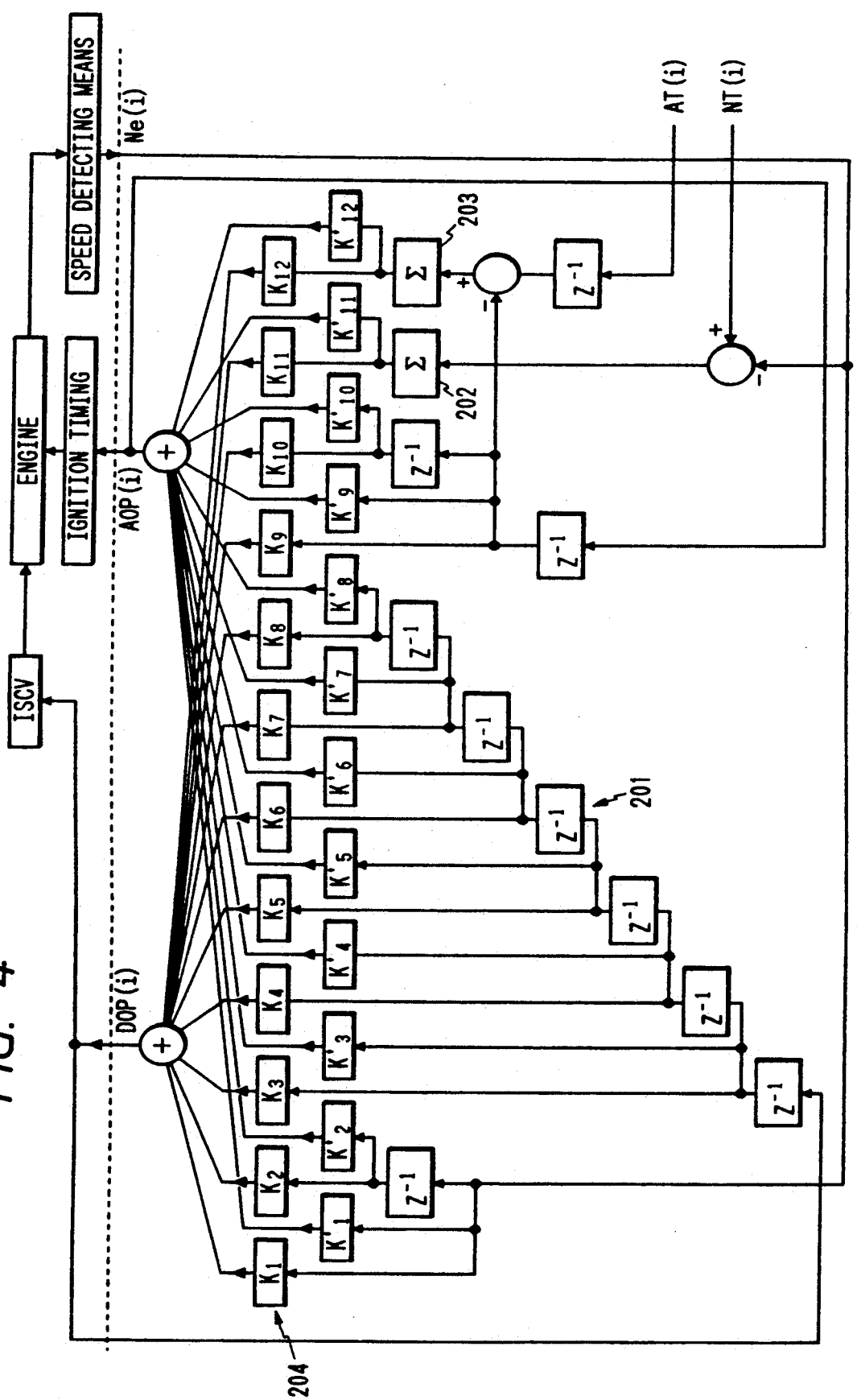
FIG. 4 is a block diagram showing an air system and an ignition system for controlling the engine idle speed.

FIG. 4 is a block diagram showing the air system and ignition system for controlling the idle speed which are constructed on the basis of the above-mentioned equations (6) to (11). In FIG. 4, parts corresponding to those in FIG. 3 are marked with the same numerals and characters. Here, although the Z−1 conversion is used for obtaining the control amount DOP(i−1) and others from DOP(i), this corresponds to the manner that the previous control amount DOP(i−1) and others are previously stored in the RAM 53 and read out and used at the time of the next control.

Figure 5:
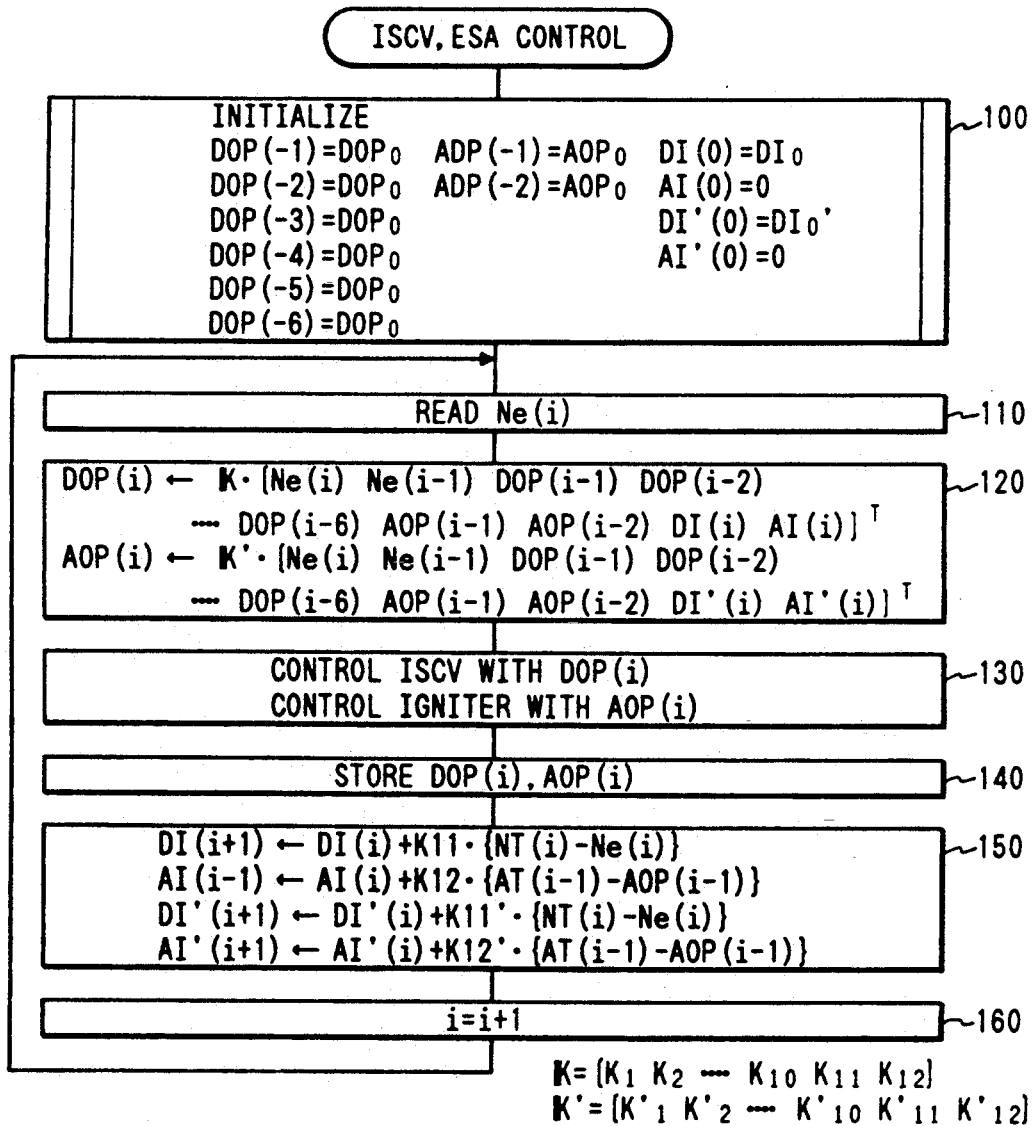
FIG. 5 is a flow chart showing an idle air quantity and ignition timing control routine of the first embodiment.

A more detailed description will be made hereinbelow with reference to FIG. 5 in terms of the idle air quantity control and the ignition timing control to be executed by the electronic control unit 20. In response to the turning-on of a power source, the electronic control unit 20 performs this FIG. 5 operation routine in addition to the fuel injection control and others. This operation starts with a step 100 for the initialization. Here, for example, the initialization is for setting the variable i indicative of the number of samplings to zero and setting the initial values of the air system and the ignition system as follows in a predetermined area of the RAM 53:

$$DOP(-1)=DOP(-2)=DOP(-3)=DOP(-4)=DOP(-5)=DOP(-6)=DOP\ 0$$

$$AOP(-1)=AOP(-2)=AOP\ 0$$

$$DI\ (0)=DI0,\ AI\ (0)=0,\ DI'\ (0)=DI'0,\ AI'\ (0)=0$$

Thereafter, a step 110 is executed to read, through the input port 56, the actual idle speed Ne(i) from the speed sensor 30, and a step 120 is then executed to respectively obtain the control amount DOP(i) of the ISC valve 44 and the control amount AOP(i) of the ignition timing on the basis of the optimal feedback gains K, K' and the state variables X. Here, in the first execution of the step 120 immediately after the initialization, the process is effected under Ne(i)=Ne(i−1). In a step 130, using the control amounts (duty ratio in this embodiment) DOP(i) and AOP(i) thus obtained, the ISC valve 44 and the igniter 27 are controlled through the output port 58, and in a step 140, the control amounts DOP(i) and AOP(i) are stored and updated as DOP(i−1) and AOP(i−1) in a predetermined area of the RAM 53 for the next operation. Subsequently, a step 150 follows to obtain and accumulate the deviation between the target speed NT and the idle speed Ne(i) and further to obtain and accumulate the deviation between the target ignition timing AT(i−1) and the ignition timing AOP(i−1), then followed by a step 160 to increment the variable i by one. Thereafter, the operational flow returns to the step 110 for repetition.

According to the speed control apparatus of this embodiment thus arranged, the state variables X(i) representative of the internal state of the system for controlling the idle speed of the engine 10 are constructed by directly using the past inputs and outputs Ne(i), Ne(i−1), DOP(i−1), . . . , DOP(i−6), AOP(i−1), AOP(i−2) of the same system, the accumulated value of the deviation between the target speed and the actual speed, and the accumulated value of the deviation between the target ignition timing and the actual ignition timing, and values obtained by performing the multiplication of the above-mentioned optimal feedback gains K and K' with respect to the values constituting the state variables X(i) are summed, whereby it is possible to determine the control amount DOP(i) of the ISC valve 44 and the control amount AOP(i) of the igniter 27. Thus, it is possible to control the idle speed of the engine 10 with an extremely high accuracy and stability and with a simple structure, without requiring the observer or the like. That is, according to this embodiment, since the idle speed is controllable on the basis of the two inputs (air quantity and ignition timing) without using the observer, it is possible to simplify the structure, realize high responsibility and stability, reduce the number of the manufacturing steps, the cost and the calculation time, and improve the control characteristic.

Here, although in the above description the controlled object is the ISC valve 44, it is also appropriate to use the air fuel ratio, the combustion pressure, the knocking or others of the engine as the controlled object. Further, it is also appropriate to use as the control input the fuel injection quantity, exhaust gas recirculating (EGR) quantity or others in place of the air quantity and the ignition timing.

Furthermore, a description will be made hereinbelow in terms of a second embodiment of this invention. This second embodiment relates to a speed control apparatus for optimally controlling the speed of an engine system whose control input has a dead time. According to this second embodiment, a first control input having a dead time is calculated on the basis of optimal feedback gains predetermined in accordance with a dynamic model, state variables and the past first control input corresponding to the dead time, and a second control input not having a dead time is calculated without using the past control input corresponding to the dead time, thereby reducing the calculation load because of not using the past control input in the calculation.

Figure 6:
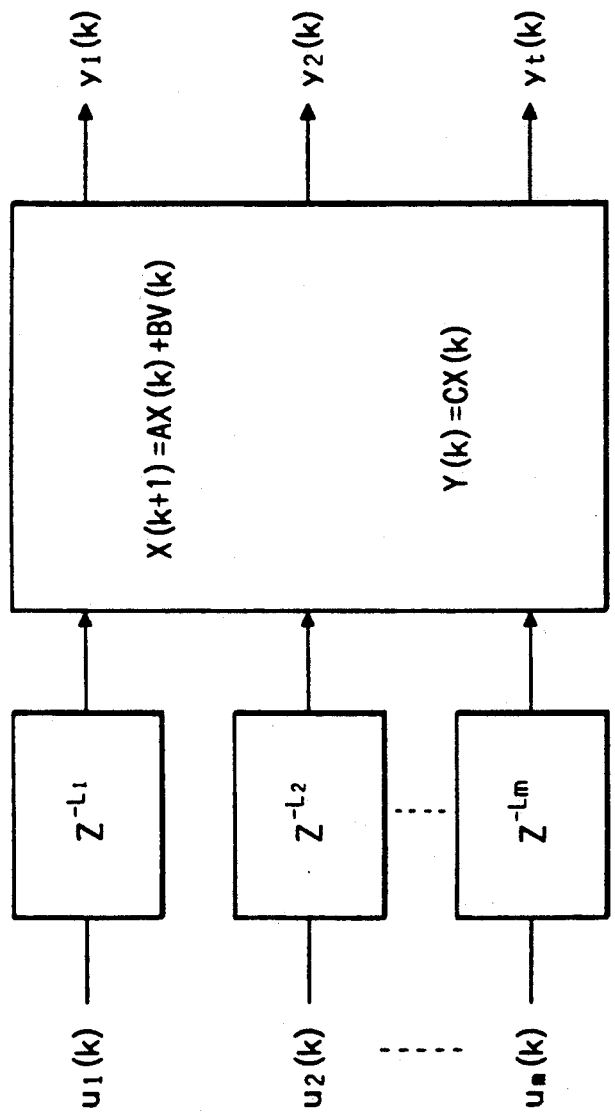
FIG. 6 illustrates a model of a controlled object taken in a second embodiment of this invention.

The control to be realized by the speed control apparatus is as follows. Here, as shown in FIG. 6, the controlled object is an n-dimension m-input t-output system, and the input section has a dead time. $L_1, L_2, \ldots, L_m$ represent the number of samples corresponding to the dead time. In the following description, a thick character represent a matrix or a vector.

The dynamic characteristics of the controlled object is expressed by the following equation (12).

$$X(k+1) = AX(k) + BV(k)$$
$$Y(k) = CX(k) \quad (12)$$

For constituting a servo system, an augmented system is constructed in accordance with the following equation (13). That is, when a state variable vector Z(k) is defined as follows:

$$Z(k) = \begin{bmatrix} X(k) - X(k-1) \\ E(k) \end{bmatrix}$$

$$E(k) = R \text{ (target value)} - Y(k)$$

and when a control input vector Ve(k) is defined as follows:

$$Ve = V(k) - V(k-1) = \begin{bmatrix} u1(k-L1) - u1(k-L1-1) \\ u2(k-L2) - u2(k-L2-1) \\ \vdots \\ um(k-Lm) - um(k-Lm-1) \end{bmatrix}$$

here, $$V^T = [u1(k-L1)\ u2(k-L2)\ldots um(k-Lm)],$$

the augmented system is expressed as follows:

$$Z(k+1) = AeZ(k) + BeVe(k) \quad (13)$$
$$E(k) = CeZ(k)$$

where

-continued $$Ae = \begin{bmatrix} A & \underline{0} \\ -CA & I_t \end{bmatrix}$$

$$Be = \begin{bmatrix} B \\ -CB \end{bmatrix} = [B1, B2 \ldots Bm]$$

$$Ce = [\underline{0}\ I_t]$$

$I_t$ = a (t×t) unit matrix, and $\underline{0}$ represents a zero matrix.

If applying the algorithm of the optimal regulator in terms of the evaluation function J with respect to the augmented system of the aforementioned equation (13), the optimal control input Ve(k) and the feedback gain matrix F are obtained in accordance with the following equation (14):

when the evaluation function J is defined as follows:

$$J = \sum_{j=0}^{\infty} [Z^T(j)QZ(j) + Ve^T(j)RVe(j)]$$

$$Q = \begin{bmatrix} q1 & & & \\ & q2 & \underline{0} & \\ & & \ddots & \\ & \underline{0} & & q(n+t) \end{bmatrix}$$

$$R = \begin{bmatrix} r1 & & & \\ & r2 & \underline{0} & \\ & & \ddots & \\ & \underline{0} & & r_m \end{bmatrix}$$

where $\underline{0}$ represents a zero matrix (all elements are zero),

The optimal control input Ve(k) for minimizing the evaluation function J becomes as follows:

$$Ve(k) = -F \cdot Z(k) \quad (14)$$

here, F represents the optimal feedback gain matrix and is as follows:

$$F = -(R + Be^T PBe)^{-1} Be^T PAe$$

and P is the solution of the following Riccati equation:

$$P = Ae^T PAe - Ae^T PBe (Be^T PBe + R)^{-1} Be^T PAe + Q$$

The following equation (15) is obtained in accordance with the aforementioned equation (13) and Ve(k) of the aforementioned equation (14), and if prediction-calculating Z(k+Li), it is possible to calculate the control input ui(k) (i=1 to m).

$$Ve(k) = \begin{bmatrix} u1 & (k-L1) & -u1 & (k-L1-1) \\ u2 & (k-L2) & -u2 & (k-L2-1) \\ \vdots & & \vdots & \\ um & (k-Lm) & -um & (k-Lm-1) \end{bmatrix} = -F \cdot Z(k) \quad (15)$$

-continued $$= - \begin{bmatrix} F1 \\ F2 \\ \cdot \\ \cdot \\ Fm \end{bmatrix} Z(k)$$

where Fi (i=1 to m) is a (1×(n+t)) matrix.

The elements of the aforementioned equation can be expressed as follows:

$$ui(k-Li)-ui(k-Li-1)=-Fi \cdot Z(k) \quad (i=1 \text{ to } m)$$

and, if advancing by Li samples, $$ui(k)-ui(k-1)=-Fi \cdot Z(k+Li) \quad (i=1 \text{ to } m)$$

If transforming Z(K+1) of the equation (13) and taking into account the equation (15), Z(k+L$_1$) can be obtained in accordance with the following equation (16), and Z(k+Li) can similarly be obtained in accordance with the following equation (17):

$$\begin{aligned} Z(k+1) &= AeZ(k) + B1(u1(k-L1) - u1(k-L1-1)) \\ &+ B2(u2(k-L2) - u2(k-L2-1)) \\ &\cdot \\ &\cdot \\ &+ Bm(um(k-Lm) - um(k-Lm-1)) \end{aligned}$$

if substituting the respective elements of the above-mentioned equation (15) into the right side (on and after the third term) of this equation, $$\begin{aligned} Z(k+1) &= \{Ae - (B2 \cdot F2 + \ldots + Bm \cdot Fm)\}Z(k) + \\ & B1(u1(k-L1) - u1(k-L1-1)) \\ &= A1Z(k) + B1(u1(k-L1) - u1(k-L1-1)) \end{aligned}$$

where Be=[B$_1$ B$_2$ ... B$_m$] when transforming this equation, $$\begin{aligned} Z(k+L1) = A1^{(L1)}Z(k) + & \\ A1^{(L1-1)} \cdot B1 \cdot (u1(k-L1) - u1(k-L1-1)) & \\ + A1^{(L1-2)} \cdot B1 \cdot (u1(k-L1+1) - u1(l-L1)) & \\ \ldots + A1 \cdot B1 \cdot (u1(k-2) - u1(k-3)) & \\ + B1 \cdot (u1(k-1) - u1(k-2)) & \end{aligned} \quad (16)$$

$$= H1 \begin{bmatrix} Z(k) \\ u1 \ (k-L1) & -u1 \ (k-L1-1) \\ u1 \ (k-L1+1) & -u1 \ (k-L1) \\ \cdot & \cdot \\ \cdot & \cdot \\ u1 \ (k-2) & -u1 \ (k-3) \\ u1 \ (k-1) & -u1 \ (k-2) \end{bmatrix}$$

here, $H1 = [A \ 1^{(L1)} \ A \ 1^{(L1-1)} \cdot B1 \ A \ 1^{(L1-2)} \cdot B1 \ldots A1 \cdot B1 B1]$ $$Z(k+Li) = Hi \begin{bmatrix} Z(k) \\ ui \ (k-Li) & -ui \ (l-Li-1) \\ ui \ (k-Li+1) & -ui \ (k-Li) \\ \cdot & \cdot \\ \cdot & \cdot \\ ui \ (k-2) & -ui \ (k-3) \\ ui \ (k-1) & -ui \ (k-2) \end{bmatrix} \quad (17)$$

here, $Hi = [Ai^{(Li)} \ Ai^{(Li-1)} \cdot Bi \ Ai^{(li-2)} \cdot Bi \ldots Ai \cdot Bi \ Bi]$ $$A^i = Ae - \sum_{j=1}^{m} Bj \cdot Fj + Bi \cdot Fi$$

If substituting Z(k+Li) of the aforementioned equation (17) into the above-mentioned equation (15), the following equation (18) can be obtained, thereby calculating the final control input ui (k) (i=1 to m). Here, the calculation of X(k) is effected by the observer.

$$ui(k) - ui(k-1) =$$

$$-Fi \cdot Hi \begin{bmatrix} Z(k) \\ ui \ (k-Li) & -ui \ (k=Li-1) \\ ui \ (k-Li+1) & -ui \ (k-Li) \\ \cdot & \cdot \\ \cdot & \cdot \\ ui \ (k-2) & -ui \ (k-3) \\ ui \ (k-1) & -ui \ (k-2) \end{bmatrix}$$

$$ui(k) = -Fi \cdot Hi \begin{bmatrix} X(k) \\ \sum_{j=0}^{k} E(j) \\ ui(k-Li) \\ ui(k-Li+1) \\ \cdot \\ \cdot \\ ui(k-2) \\ ui(k-1) \end{bmatrix} \quad (18\text{-}1)$$

$$= K^i \cdot \sum_{j=0}^{k} E(j) + L^i \cdot X(k) + M^i \begin{bmatrix} u^i(k-L^i) \\ u^i(k-L^i+1) \\ \cdot \\ \cdot \\ u^i(k-1) \end{bmatrix}$$

here, [Li Ki Mi]=−Fi·Hi

According to this control method, since the i$^{th}$ control input ui(k) is determined only on the basis of the values of the its own past control inputs corresponding to the number of samples corresponding to its own dead time, for determining the control inputs from u1(k) to um(k), it is possible to omit the calculations of (L$_1$+L$_2$+ ... +L$_m$) (m−1) times as shown by the following equation (18-2) as compared with a conventional method where the control inputs depend upon different past control input values, thereby considerably reducing the calculation load.

$$\begin{aligned} (L2 + L3 + \ldots + Lm) &\leftarrow u1(k) \\ + (L1 + L3 + \ldots + Lm) &\leftarrow u2(k) \\ &\cdot \\ + (L1 + L2 + \ldots + Li-1 + Li+1 + \ldots + Lm) &\leftarrow ui(k) \end{aligned} \quad (18\text{-}2)$$

-continued $$+ (L1 + L2 + \ldots + Lm - 1) \leftarrow um(k)$$
$$= (L1 + L2 + \ldots + Lm)(m - 1)$$

Further, a description will be made hereinbelow with reference to FIGS. 6 and 7 in terms of an operation in the case of controlling the idle speed ne of the engine 10 by the ignition timing Igt and the duty Duty(k) of a bypass air valve (corresponding to ISC valve 44). Here, in this embodiment the order of the 2-input 1-output engine model is 4, and further Duty(k) has a dead time corresponding to L (the number of samples)=3. First, a description will be made in terms of the procedure of obtaining the optimal engine operating amounts (control inputs) $u_1(k)$, $u_2(k)$ in the case that the engine control input u2 has a dead time corresponding to the sample number L.

In the case that the object is a system which is expressed by the following matrix equation when the engine speed at the sampling time k is taken to be y(k), the control input vector whose factors are two kinds of engine operating amounts u1, u2 is taken as U(k), and the state variable representing the engine dynamic characteristic is X(k):

$$X(k+1) = AX(k) + BU(k)$$

$$y(k) = CX(k),$$

when the target engine speed is r and the speed deviation is e(k) (=r−y(k)), the state variable vector Z(k) is given in accordance with the following equation (19) and the control input vector Ve(k) is obtained in accordance with the following equation (20), thereby defining the following expanded matrix equation (21):

$$Z(k) = \begin{bmatrix} X(k) - X(k-1) \\ e(k) \end{bmatrix} \tag{19}$$

$$Ve(k) = V(k) - V(k-1) \tag{20}$$
$$= \begin{bmatrix} u1\ (k) & -u1\ (k-1) \\ u2\ (k-L) & -u2\ (k-L-1) \end{bmatrix}$$
$$= \begin{bmatrix} v1\ (k) \\ v2\ (k-L) \end{bmatrix}$$

where, $V(k) = \begin{bmatrix} u1\ (k) \\ u2\ (k-L) \end{bmatrix}$

L represents the number of samples corresponding to the dead time.

$$Z(k+1) = AeZ(k) + BeVe(k)$$

$$e(K) = CeZ(k) \tag{21}$$

where $$Ae = \begin{bmatrix} A & 0 \\ -CA & 1 \end{bmatrix}$$

$$Be = \begin{bmatrix} B \\ -CB \end{bmatrix}$$

$$Ce = [0\ 1]$$

The optimal feedback gain matrix for giving the control input vector Ve(k) (=−FZ(k)) which minimizes the evaluation function J (expressed by the following equation (22)) in terms of the aforementioned equation (21) is obtained in accordance with the following equation (23), and the above-mentioned matrix F is defined as expressed by the following equation (24) and the above-mentioned matrix B is defined to be Be=[B₁ B₂] to thereby obtain the matrix H in accordance with the following equation (25):

$$J = \sum_{k=0}^{\infty} (e^2(k) + Ve^T(k)RVe(k)) \tag{22}$$

where R is a weighting parameter matrix.

$$F = -(R + Be^T PBe)^{-1} Be^T PAe \tag{23}$$

where P is the solution of the following Riccati equation:

$$Q = \begin{bmatrix} 0 & & \underline{0} \\ & \ldots 0 & \\ \underline{0} & & 1 \end{bmatrix}$$

$$F = \begin{bmatrix} F_1 \\ F_2 \end{bmatrix} \tag{24}$$

$$H = [Ae'^{(L)}\ Ae'^{(L-1)} \cdot Be'\ Ae'^{(L-2)} \cdot Be' \ldots Ae' \cdot Be'\ Be'] \tag{25}$$

where $$Ae' = Ae - B1 \cdot F1$$

$$Be' = B2$$

and $\underline{O}$ represents a zero matrix.

Fs, K and Fi are obtained on the basis of the aforementioned matrixes $F_1$, $F_2$ and H in accordance with the following equation (26) and the optimal operating amounts $u_1(k)$ and $u_2(k)$ at the sampling time k are then obtained in accordance with the following equation (27):

$$-\begin{bmatrix} F_1 & \underline{0} \\ F_2 & \cdot H \end{bmatrix} = [Fs\ K\ Fi] \tag{26}$$

$$\begin{bmatrix} u_1(k) \\ u_2(k) \end{bmatrix} = W(k) + FsX(k) + Fi \begin{bmatrix} u_2(K-L) \\ u_2(K-L+1) \\ \vdots \\ u_2(K-1) \end{bmatrix} \tag{27}$$

where W(k)=W(k−1)+Ke(k).

As expressed by the following equation (28), in the aforementioned matrix Fi, all the L elements of the line vector at the upper stage are zero. Thus, the past value is not used for the calculation of the u1 (k) not having the dead time, and since the calculation of u2 (k) having the dead time L is performed only on the basis of its own past values, the L calculations can be omitted, thereby considerably reducing the calculation amount.

$$Fi = \begin{bmatrix} 0 & 0 & \cdots & \cdots & \cdots & 0 \\ Fi1 & Fi2 & \cdots & \cdots & \cdots & Fim \end{bmatrix} \quad (28)$$

Figure 7:
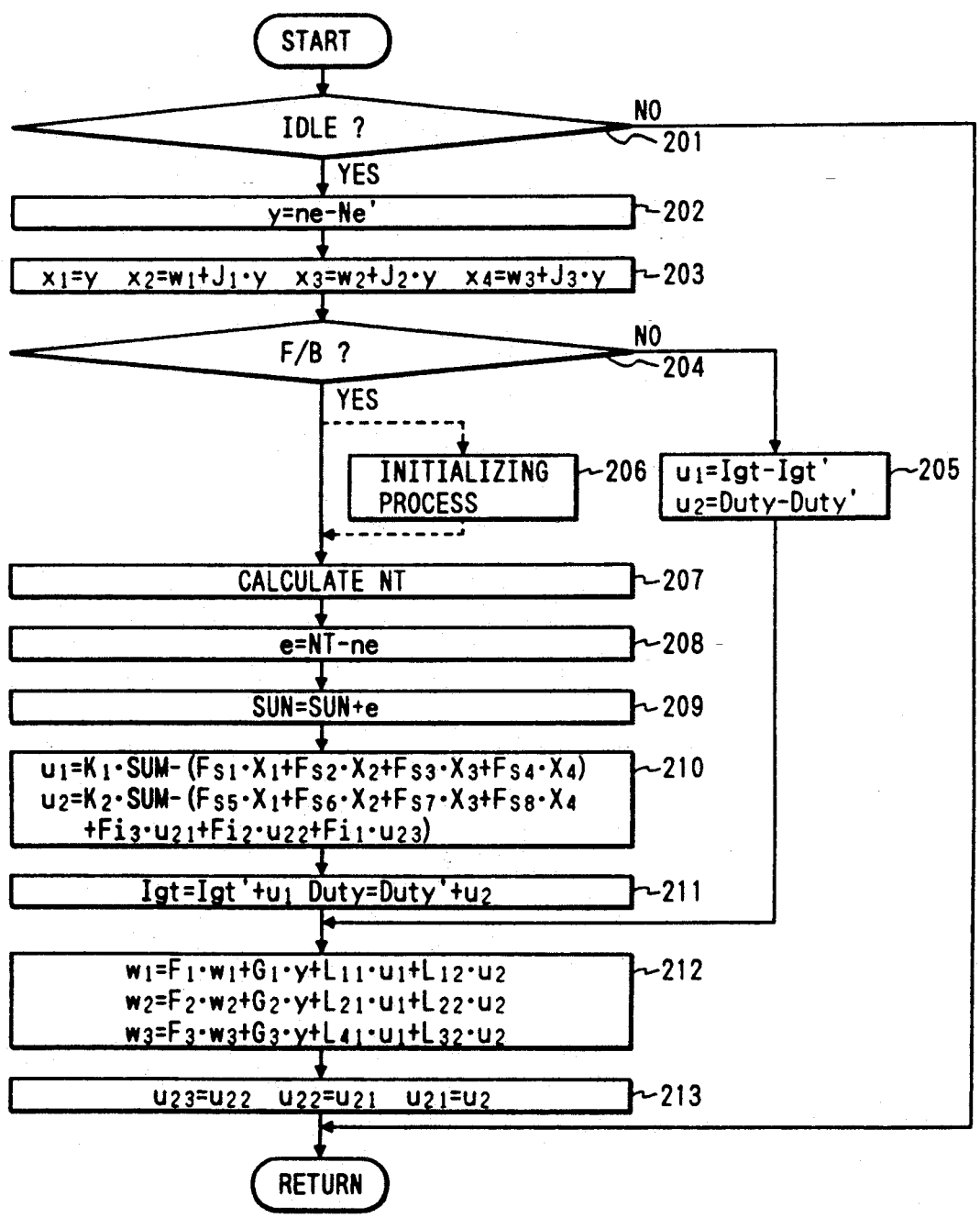
FIG. 7 is a flow chart showing an operation to be executed in the second embodiment of this invention.

In FIG. 7, the operation starts with a step 201 to check, on the basis of a signal from an idle switch or the like, whether the engine is in the idling state, then followed by a step 202 to obtain a variation y ($=ne-Ne'$) of the current speed ne from the speed equilibrium point Ne', and further followed by a step 203 to obtain state variables $x_1$ to $x_4$ through the minimum order observer. Subsequently, a step 204 follows to check, on the basis of the engine speed, the vehicle speed, water temperature and others, whether the feedback control is necessary or not. If unnecessary, in a step 205 the operating amount variations u1, u2 are calculated on the basis of the ignition timing equilibrium point Igt' and the duty equilibrium point Duty', thereafter advancing to a step 212. On the other hand, if the answer of the step 204 is affirmative, a step 206 is executed to perform the initialization process to set a cumulative value SUM (which will be described hereinafter) to the initial value, and a step 207 is then executed in order to calculate the target speed NT, and steps 208 and 209 are further executed so as to obtain the speed deviation e and the cumulative value SUM thereof.

Thereafter, a step 210 follows to obtain the operating amounts $u_1$ and $u_2$ as illustrated in FIG. 7. Here, matrixes K, Fs and Fi (expressed by the following equations (29) to (31)) are defined on the basis of the factors, i.e., the coefficients $K_1$, $K_2$, $Fs_1$ to $Fs_8$, $Fi_1$ to $Fi_3$, so as to transform them to a matrix equation. This matrix equation corresponds to the matrix equation expressed by the above-mentioned equation (27), and hence the respective coefficients $K_1$, $K_2$, $Fs_1$ to $Fs_8$, $Fi_1$ to $Fi_3$ are previously calculated in accordance with the above-mentioned equation (26). Since in the matrix Fi all the line vectors at the upper stage where the number of samples corresponding to the dead time is 3 are zero, the number of the calculations can become smaller.

$$K = \begin{bmatrix} K^1 \\ K^2 \end{bmatrix} \quad (29)$$

$$Fs = \begin{bmatrix} Fs^1 & Fs^2 & Fs^3 & Fs^4 \\ Fs^5 & Fs^6 & Fs^7 & Fs^8 \end{bmatrix} \quad (30)$$

$$Fi = \begin{bmatrix} 0 & 0 & 0 \\ Fi^1 & Fi^2 & Fi^3 \end{bmatrix} \quad (31)$$

The satisfaction of the above-mentioned equation (26) is based upon the following reason.

Since $v_2(k-L) = -F_2 Z(k)$ from $Ve(k) = -FZ(k)$, $v_2(k) = -F_2 Z(k+L)$. Here, $Z(k+1)$ is expressed by the following equation (32) and, if successively obtaining $Z(k+2)$, $Z(k+3)$, ..., $Z(k+L)$ in accordance with this equation, $Z(k+L)$ can be obtained as the following equation (33). If taking into account $v_1(k) = -F_1 Z(k)$, the following equation (34) can be obtained:

$$\begin{aligned} Z(k+1) &= Ae\, Z(k) + B1\, v1(k) + B2\, v2(k-L) \\ &= Ae'Z(k) + Be'v2(k-L) \end{aligned} \quad (32)$$

$$Z(k+L) = H \begin{bmatrix} Z(k) \\ v2(k-L) \\ v2(k-L+1) \\ \vdots \\ v2(k-1) \end{bmatrix} \quad (33)$$

$$\begin{bmatrix} v^1(k) \\ v^2(k) \end{bmatrix} = \begin{bmatrix} F^1 & 0 \\ F^2 & H \end{bmatrix} \begin{bmatrix} Z(k) \\ v^2(k-L) \\ v^2(k-L+1) \\ \vdots \\ v^2(k-1) \end{bmatrix} \quad (34)$$

On the other hand, if the control law of u1, u2 is given by the above-mentioned equation (27), the following equation (35) can be obtained, thus obtaining the above-mentioned equation (26) by the comparison between the equations (35) and (34):

$$\begin{aligned} \begin{bmatrix} v1(k) \\ v2(k) \end{bmatrix} &= \begin{bmatrix} u1(k) - u1(k-1) \\ u2(k) - u2(k-1) \end{bmatrix} \\ &= Ke(k) + Fs(X(k) - X(k-1)) + \\ &\quad Fi \begin{bmatrix} v2(k-L) \\ v2(k-L+1) \\ \vdots \\ v2(k-1) \end{bmatrix} \\ &= [FsKFi] \begin{bmatrix} Z(k) \\ v2(k-L) \\ v2(k-L+1) \\ \vdots \\ v2(k-1) \end{bmatrix} \end{aligned} \quad (35)$$

In FIG. 7, a step 211 is for calculating the final operating amounts Igt(k), Duty(k), and a step 212 is for performing the calculation by the observer. In a step 213, the past operating amounts are kept by a necessary number (3).

Figure 8:
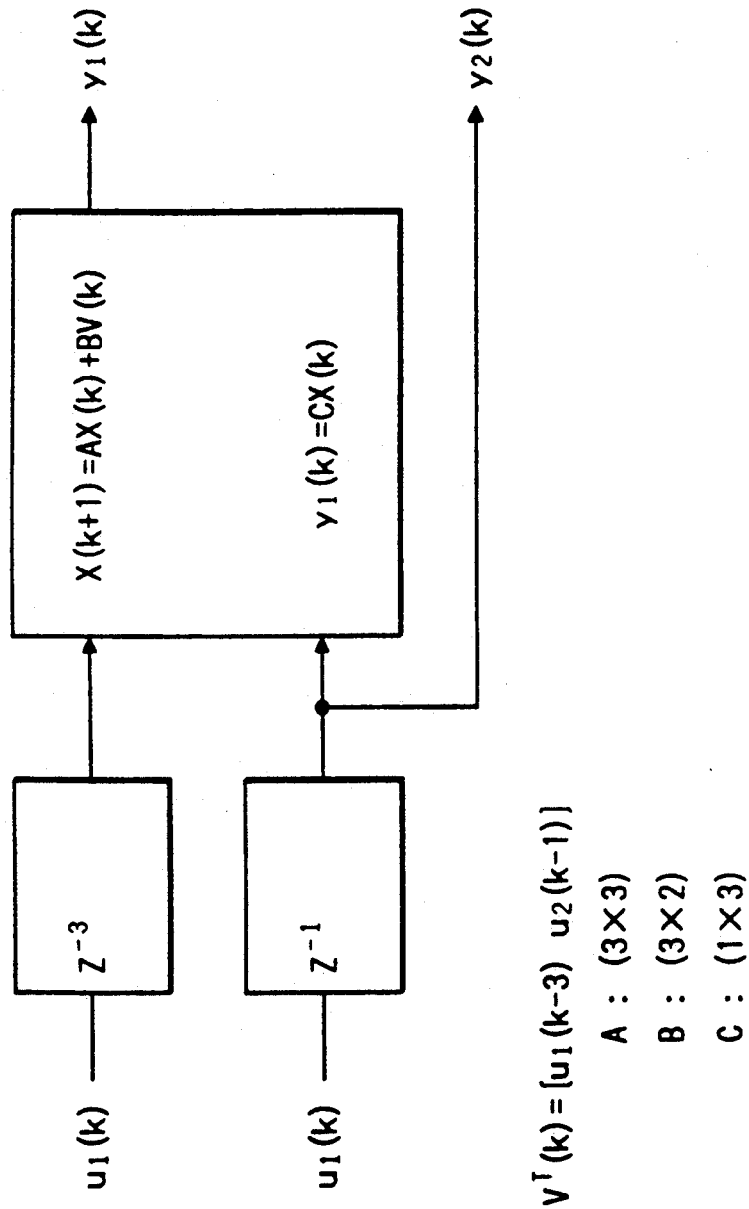
FIG. 8 illustrates a model of a controlled object taken in a third embodiment of this invention.
Figure 9:
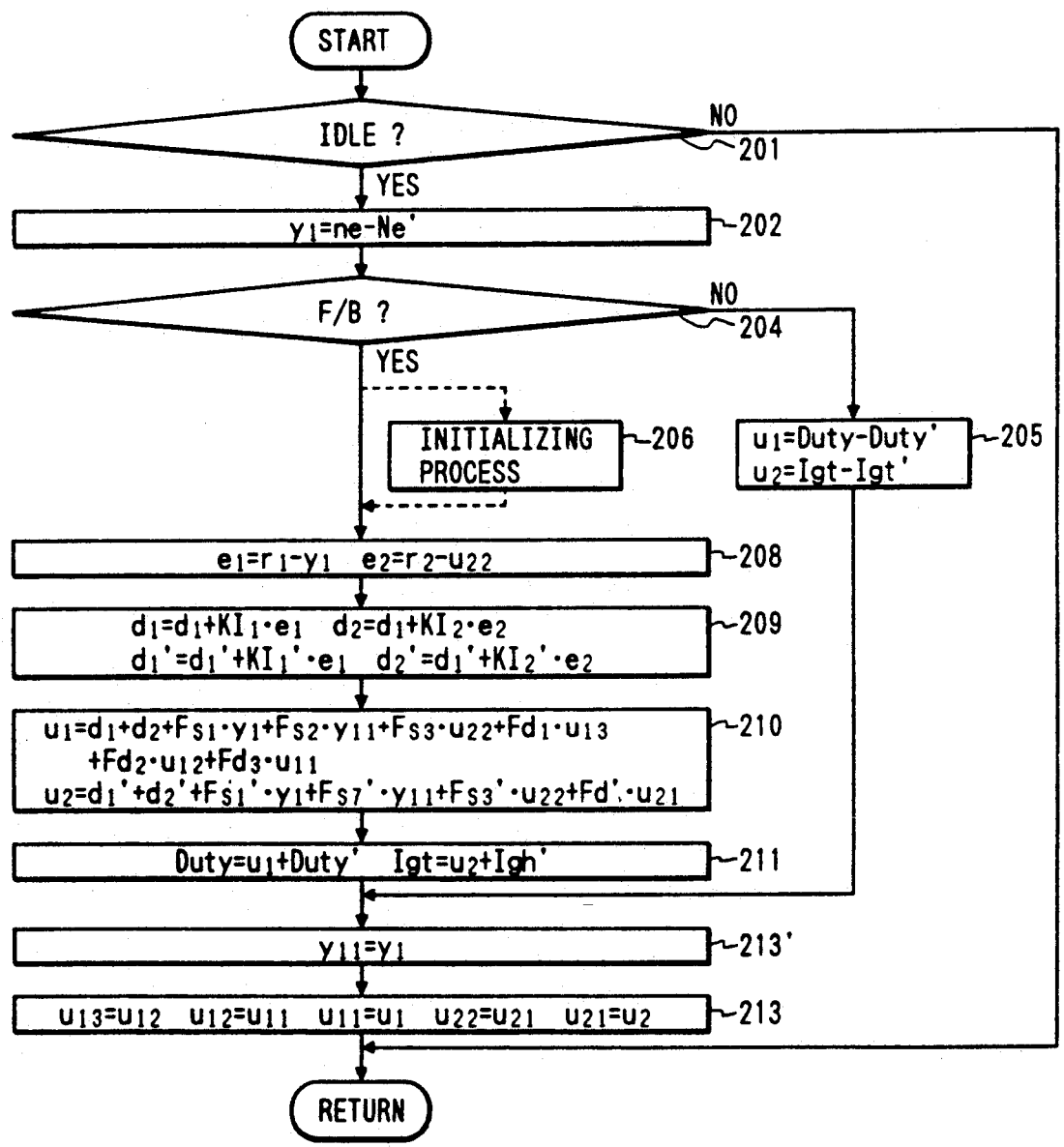
FIG. 9 is a flow chart showing an operation to be executed in the third embodiment of this invention.

Further, a description will be made hereinbelow with reference to FIGS. 8 and 9 in terms of a third embodiment of this invention. FIG. 8 shows a 2-input 2-output system engine model, and in FIG. 9 steps substantially corresponding to those in FIG. 7 are marked with the same numerals. Here, $u_1(k)$ is the duty Duty(k) of the bypass air valve, the dead time $L_1$ is 3 samples, and u2 (k) is the ignition timing Igt (k), the dead time $L_2$ is one sample. Further, $y_1(k)$ is the engine speed.

When the relation between the input and output is expressed by the following equation (36), the state variables are defined by the following equation (37) and the matrix equation of the controlled object is indicated by the following equation (38). Further, the augmented system is defined by the following equation (39) so as to obtain the optimal feedback gain F for minimizing the evaluation function expressed by the following equation (40).

$$y1(k+1) = a1\,y1(k) + a2\,y1(k-1) + b1\,u1(k-3) + \quad (36)$$
$$\qquad\qquad c1\,u2(k-1) + c2\,u2(k-2)$$
$$y2(k) = u2(k-1)$$

$$x1(k) = y1(k) \quad (37)$$
$$x2(k) = y1(k-1)$$
$$x3(k) = u2(k-2)$$

$$X(k+1) = \begin{bmatrix} a1 & a2 & a3 \\ 1 & 0 & 0 \\ 0 & 0 & 0 \end{bmatrix} X(k) + \begin{bmatrix} b1 & c1 \\ 0 & 0 \\ 0 & 1 \end{bmatrix} \begin{bmatrix} u1(k-3) \\ u3(k-1) \end{bmatrix}$$

$$y1(k) = [1\ 0\ 0]\,x(k) \quad (38)$$
$$y2(k) = u2(k-1)$$

where $$X^T(k) = [x1(k)\ x2(k)\ x3(k)] \quad (39)$$
$$Z(k+1) = Ae\,Z(k) + Be\,Ve(k)$$
$$E(k) = Ce\,Z(k)$$

$$\text{here, } Ae = \begin{bmatrix} A & 0 & 0 \\ -CA & 1 & 0 \\ 0 & 0 & 0 \end{bmatrix}$$

$$Be = \begin{bmatrix} B \\ -CA \\ 0 \quad -1 \end{bmatrix}$$

$$Ce = \begin{bmatrix} 0 & 1 & 0 \\ 0 & 0 & 1 \end{bmatrix}$$

$$Ve = V(k) - V(k-1),\ E(k) = \begin{matrix} e1(k) \\ e2(k-1) \end{matrix}$$

$$J = \sum_{k=0}^{\infty} (E^T(k)Q'E(k) + Ve^T(k)R\,Ve(k)) \quad (40)$$

here, $$E(k) = \begin{bmatrix} e1(k) \\ e2(k-1) \end{bmatrix} = \begin{bmatrix} r1(k) - y1(k) \\ r2(k-1) - u2(k-2) \end{bmatrix}$$

$$Ve(k) = V(k) - V(k-1)$$
$$= \begin{bmatrix} u1(k-3) - u1(k-4) \\ u2(k-1) - u2(k-2) \end{bmatrix}$$

$$Q' = \begin{bmatrix} q1 & 0 \\ 0 & q^2 \end{bmatrix}$$

$$R = \begin{bmatrix} r1 & 0 \\ 0 & r2 \end{bmatrix}$$

In addition, when the H matrix is obtained in accordance with the following equation (41), the optimal control inputs u1 (k) and u2 (k) can be obtained by the following equations (42) and (43). Thus, as being known, u1 (k) can be determined only by the values u1 (k−1), u1 (k−2) and u1 (k−3) corresponding to its own past 3 samples without depending on the past values of u2 (k). Similarly, u2 (k) can be determined only by the value u2 (k−1) corresponding to the its own past one sample without depending on the past values of u1 (k). Accordingly, it is possible to omit the calculation amount corresponding to (1+3)·1=4.

$$H = \begin{bmatrix} H1 \\ H2 \end{bmatrix}$$

here, $H1 = [D1^3\ D1^2\ B1\ D1 \cdot B1\ B1]$ $H2 = [D2\ B2]$ $D1 = Ae - B2\,F2$ $D2 = Ae - B1\,F1$ $Be = [B1\ B2]$ $$F = \begin{bmatrix} F1 \\ F2 \end{bmatrix} \quad (41)$$

$$u1(k) = -F1\,H1 \begin{bmatrix} X(k) \\ \Sigma E(k) \\ u1(k-3) \\ u1(k-2) \\ u1(k-1) \end{bmatrix} \quad (42)$$

$$= d1(k) + d2(k) + Fs\,X(k) + Fd \begin{bmatrix} u1(k-3) \\ u1(k-2) \\ u1(k-1) \end{bmatrix}$$

here, $d1(k) = d1(k-1) + KI1(r1(k) - y1(k))$
$d2(k) = d2(k-1) + KI2(r2(k-1) - u2(k-2))$ $$u2(k) = -F2\,H2 \begin{bmatrix} X(k) \\ \Sigma E(k) \\ u2(k-1) \end{bmatrix} \quad (43)$$

$$= d1'(k) + d2'(k) + Fs'X(k) + Fd'u2(k-1)$$

here, $d1'(k) = d1'(k-1) + KI1'(r1(k) - y1(k))$
$d2'(k) = d2'(k-1) + KI2'(r2(k-1) - u2(k-2))$ It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A speed control apparatus for an internal combustion engine which is equipped with speed detecting means for detecting an idle speed of said engine; air quantity control means for controlling an intake air quantity to said engine when said engine is in an idling state; and speed control means for determining a control amount of said air quantity control means on the basis of the detected idle speed of said engine to control the detected engine idle speed to a target speed, said apparatus comprising:

a state variable outputting section for outputting the detected idle speed of said engine, the control amount of said air quantity control means and an ignition timing control amount of an igniter of said engine as state variables representing an internal state of a dynamic model of said engine;

a speed deviation accumulating section for accumulating a deviation between said target speed and the detected engine idle speed to obtain a speed variation accumulated value;

an ignition timing deviation accumulating section for accumulating a deviation between a target ignition timing and an actual ignition timing detected to obtain an ignition timing deviation accumulated value; and an air system and ignition system control amount calculating section for calculating said control amount of said air quantity control means and said ignition timing control amount of said igniter on the basis of optimal feedback gains of an air system and an ignition system predetermined on the basis of said dynamic model, said state variables, said speed deviation accumulated value and said ignition timing deviation accumulated value.

2. A control apparatus for an internal combustion engine which is equipped with operating state value detecting means for detecting an operating state value of said engine; first control means for controlling a first control amount affecting said operating state value of said engine; and target value control means for determining a control amount of said first control means on the basis of the detected operating state value of said engine to control the detected operating state value to a target value, said control apparatus comprising:

a state variable outputting section for outputting the detected operating state value of said engine, said control amount of said first control means and a second control amount affecting said operating state value of said engine as state variables representing an internal state of a dynamic model of said engine;

an operating state value deviation accumulating section for accumulating a deviation between said target value and the detected operating state value to obtain an operating state value variation accumulated value;

a second control amount deviation accumulating section for accumulating a deviation between a target value for said second control amount and the second control amount detected to obtain a second control amount deviation accumulated value; and a first and second controlled system control amount calculating section for calculating said control amount of said first control means and said second control amount on the basis of optimal feedback gains of first and second controlled systems predetermined on the basis of said dynamic model, said state variables, said operating state value deviation accumulated value and said second control amount deviation accumulated value.

3. An apparatus as claimed in claim 2, wherein said first control means is means for controlling a quantity of intake air to be introduced into said engine.

4. An apparatus as claimed in claim 3, wherein said first control amount is the quantity of the intake air and said second control amount is an ignition timing to be taken by an igniter of said engine.

5. An apparatus as claimed in claim 2, wherein said operating state value is a rotational speed of said engine.

6. An apparatus as claimed in claim 3, wherein said intake air quantity control means comprises bypass passage means for bypassing a throttle valve and valve means provided in said bypass passage, said valve means being arranged to be controllable in accordance with a duty ratio of a control signal to be applied thereto.

7. An apparatus as claimed in claim 2, wherein said state variables are constituted directly on the basis of the previous operating state value and first and second control amounts stored in storing means and the accumulated values.

8. An apparatus as claimed in claim 6, wherein said control amount calculating section calculates said control amount of said first control means and said second control amount with values, which are obtained by multiplying said optimal feedback gains to the value constituting said state variables, being summed.

9. A speed control apparatus for an internal combustion engine for determining a speed of said engine on the basis of a model set with a multi-input and at least one output system which is responsive to a first control input having a dead time at its input section and a second control input not having a dead time to output at least an engine speed as an output amount, said apparatus comprising:

state variable setting means for setting said engine speed and said first and second control inputs as state variables representing an internal state of said model;

first calculating means for calculating said first control input on the basis of optimal feedback gains predetermined in accordance with said model, said state variables, and a first control input corresponding to said dead time; and second calculating means for calculating said second control input on the basis of said optimal feedback gains predetermined in accordance with said model, and said state variables.

10. A speed control apparatus for an internal combustion engine which is a multi-input and multi-output system to be responsive to m control inputs having a dead time to generate t outputs including a rotational speed of said engine, said apparatus comprising:

target value setting means for setting a target value for each output;

output detecting means for detecting each output value;

means for accumulating a deviation between each of said target values and each of said output values;

means for calculating a state variable representative of an internal state of a dynamic model of said engine;

storage means for storing a past value of each control input; and control input determining means for determining each control input $u_i (i=1,2,\ldots,m)$ on the basis of a feedback gain predetermined from said dynamic model, each of said deviation accumulation values, said state variable, and each of said past values of said control inputs $u_i (i=1,2,\ldots,m)$ stored in said storage means.

11. An apparatus as claimed in claim 10, wherein said storage means includes means for respectively storing said past values $u_i(k-1)$ to $u_i(k-L_i)$ of said control inputs $u_i$ in terms of $i=1$ to m where $L_i$ represents the number of samples corresponding to said dead time of said control input $u_i$.

12. An apparatus as claimed in claim 11, wherein said control input determining means determines each of said control inputs $U_i, U_2 \ldots U_m$ only on the basis of said past values $U_1(k-1)$ to $U_1(k-L_i)$, $U_2(k-1)$ to $U_2(k-L_i)$, $\ldots U_m(k-1)$ to $Um(k-L_i)$, respectively, stored in said storage means.

* * * * *